(12) United States Patent
Horiuchi et al.

(10) Patent No.: US 11,356,223 B2
(45) Date of Patent: Jun. 7, 2022

(54) BASE STATION, TERMINAL, AND COMMUNICATION METHOD

(71) Applicant: Panasonic Intellectual Property Corporation of America, Torrance, CA (US)

(72) Inventors: Ayako Horiuchi, Kanagawa (JP); Hidetoshi Suzuki, Kanagawa (JP); Lilei Wang, Beijing (CN)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 78 days.

(21) Appl. No.: 16/492,511

(22) PCT Filed: Mar. 24, 2017

(86) PCT No.: PCT/CN2017/077981
§ 371 (c)(1),
(2) Date: Sep. 9, 2019

(87) PCT Pub. No.: WO2018/170865
PCT Pub. Date: Sep. 27, 2018

(65) Prior Publication Data
US 2021/0135824 A1    May 6, 2021

(51) Int. Cl.
*H04W 48/12* (2009.01)
*H04L 5/00* (2006.01)
(Continued)

(52) U.S. Cl.
CPC .......... *H04L 5/0053* (2013.01); *H04L 5/0094* (2013.01); *H04W 72/042* (2013.01); *H04W 72/1205* (2013.01)

(58) Field of Classification Search
CPC ..................................................... H04L 5/0094
See application file for complete search history.

(56) References Cited

U.S. PATENT DOCUMENTS

2012/0281646 A1   11/2012  Liao et al.
2013/0194931 A1   8/2013   Lee et al.
(Continued)

FOREIGN PATENT DOCUMENTS

CN   104640214 A    5/2015
JP   2014-509810 A  4/2014
(Continued)

OTHER PUBLICATIONS

International Search Report, dated Nov. 30, 2017, for corresponding International Application No. PCT/CN2017/077981, 3 pages.
(Continued)

*Primary Examiner* — John D Blanton
(74) *Attorney, Agent, or Firm* — Seed IP Law Group LLP

(57) ABSTRACT

UEs each monitor a search space in multiple CORSETs and appropriately detect a DCI. In a base station (100), a DCI generator (102) selects one of multiple cases each indicating a combination of CORSETs to be monitored by a terminal (200) among multiple control channel regions (CORSETs). A transmitter (106) indicates, by higher-layer signaling, configuration information indicating the multiple cases, and indicates the selected case by dynamic signaling.

13 Claims, 7 Drawing Sheets

|        | UE A         | UE B         | UE C           |
|--------|--------------|--------------|----------------|
| Case 1 | CORSET A     | CORSET A     | CORSET A       |
| Case 2 | CORSET A     | CORSET A,B   | CORSET A,B     |
| Case 3 | CORSET A     | CORSET A,B   | CORSET A,B,C   |
| Case 4 | No monitoring| No monitoring| No monitoring  |

(51) Int. Cl.
*H04W 72/12* (2009.01)
*H04W 72/04* (2009.01)

(56) References Cited

U.S. PATENT DOCUMENTS

| | | |
|---|---|---|
| 2014/0036802 A1 | 2/2014 | Chen et al. |
| 2014/0374462 A1 | 12/2014 | Ebbesson et al. |
| 2018/0213477 A1* | 7/2018 | John Wilson ......... H04L 5/0053 |
| 2018/0227777 A1* | 8/2018 | Sun ................... H04W 52/0212 |
| 2018/0294859 A1* | 10/2018 | Niu ....................... H04L 5/0051 |
| 2019/0334687 A1* | 10/2019 | Su .......................... H04L 5/0023 |
| 2020/0245351 A1* | 7/2020 | Takeda .............. H04W 72/1289 |
| 2021/0014791 A1* | 1/2021 | Freda ................ H04W 52/0229 |

FOREIGN PATENT DOCUMENTS

| | | |
|---|---|---|
| JP | 2015-508956 A | 3/2015 |
| JP | 2015-509856 A | 4/2015 |
| JP | 2015-530022 A | 10/2015 |

OTHER PUBLICATIONS

NTT DOCOMO, "Revision of SI: Study on New Radio Access Technology," RP-161596 (revision of RP-161214), Agenda Item: 9.2.2, 3GPP TSG RAN Meeting #73, New Orleans, Sep. 19-22, 2016, 7 pages.

Panasonic, "Discussion on group common PDCCH," R1-1702764, Agenda Item: 8.1.3.1.2, 3GPP TSG RAN WG1 Meeting #88, Athens, Greece, Feb. 13-17, 2017, 5 pages.

Intel Corporation, "General aspects for NR search space", R1-1702223, Agenda Item: 8.1.3.1.4, 3GPP TSG RAN WG1 Meeting #88, Athens, Greece, Feb. 13-17, 2017, 5 pages.

Indian Office Action, dated Aug. 24, 2021, for Indian Application No. 201927036101, 4 pages.

* cited by examiner

100

200

|  | UE A | UE B | UE C |
|---|---|---|---|
| Case 1 | CORSET A | CORSET A | CORSET A |
| Case 2 | CORSET A | CORSET A,B | CORSET A,B |
| Case 3 | CORSET A | CORSET A,B | CORSET A,B,C |
| Case 4 | No monitoring | No monitoring | No monitoring |

|  | UE A | UE B | UE C |
|---|---|---|---|
| Case 1 | CORSET A | No monitoring | No monitoring |
| Case 2 | No monitoring | CORSET B | No monitoring |
| Case 3 | No monitoring | No monitoring | CORSET C |
| Case 4 | CORSET D | CORSET D | CORSET D |

BASE STATION, TERMINAL, AND COMMUNICATION METHOD

TECHNICAL FIELD

The present disclosure relates to a base station, a terminal, and a communication method.

BACKGROUND ART

A communication system so called the fifth generation mobile communication system (5G) has been under study. In 5G, studies have been conducted on flexibly providing functions respectively for use cases where communication traffic increases, where the number of terminals to be connected increases, and where high reliability and/or low latency is required. There are three representative use cases, which are enhanced Mobile Broadband (eMBB), massive Machine Type Communications (mMTC), and Ultra Reliable and Low Latency Communications (URLLC). The 3rd Generation Partnership Project (3GPP), which is an international standardization organization, has been conducting studies on further evolution of the communication system from both aspects of further evolution of the LTE systems and New Radio Access Technology (RAT) (see, e.g., Non-Patent Literature (hereinafter, referred to as "NPL") 1).

CITATION LIST

Non-Patent Literature

NPL 1
RP-161596, "Revision of SI: Study on New Radio Access Technology," NTT DOCOMO, September 2016
NPL 2
R1-1702764, "Discussion on group common PDCCH", Panasonic, February 2017

SUMMARY OF INVENTION

In New RAT, studies have been carried out on configuring a terminal (User Equipment: UE) with multiple control resource sets (hereinafter, referred to as "CORSETs") as a Physical Downlink Control Channel (PDCCH) region, which is a control signal channel where a downlink control indicator (DCI) is mapped. In New RAT, however, studies on a method in which a UE monitors (blind decoding) a search space in multiple CORSETs and detects a DCI have not been carried out enough.

One non-limiting and exemplary embodiment of this disclosure facilitates providing a base station, a terminal, and a communication method each allowing a UE to monitor a search space in multiple CORSETs and to appropriately detect a DCI.

A base station according to an aspect of the present disclosure includes: circuitry, which, in operation, selects one of a plurality of cases each indicating a combination of control channel regions to be monitored by a terminal among a plurality of control channel regions; and a transmitter, which in operation, indicates, by higher-layer signaling, configuration information indicating the plurality of cases, and indicates the selected case by dynamic signaling.

A terminal according to an aspect of the present disclosure includes: a receiver, which in operation, receives higher-layer signaling containing configuration information indicating a plurality of cases each indicating a combination of control channel regions to be monitored by the terminal among a plurality of control channel regions, and receives dynamic signaling indicating one of the plurality of cases; and circuitry, which, in operation, detects control information directed to the terminal in the control channel region corresponding to the one case indicated by the dynamic signaling among the plurality of cases.

A communication method according to an aspect of this disclosure includes: selecting one of a plurality of cases each indicating a combination of control channel regions to be monitored by a terminal among a plurality of control channel regions; and indicating, by higher-layer signaling, configuration information indicating the plurality of cases, and indicating the selected case by dynamic signaling.

A communication method according to an aspect of this disclosure includes: receiving higher-layer signaling containing configuration information indicating a plurality of cases each indicating a combination of control channel regions to be monitored by a terminal among a plurality of control channel regions, and receiving dynamic signaling indicating one of the plurality of cases; and detecting control information directed to the terminal in the control channel region corresponding to the one case indicated by the dynamic signaling among the plurality of cases.

Note that the comprehensive or specific aspects mentioned above may be implemented by a system, an apparatus, a method, an integrated circuit, a computer program or a recoding medium, or any combination of the system, the apparatus, the method, the integrated circuit, the computer program, and the recoding medium.

According to an aspect of this disclosure, a UE monitors a search space in multiple CORSETs and can appropriately detect a DCI.

The specification and the drawings make it clear more advantages and effects in an aspect of this disclosure. Such advantages and/or effects are provided by the features disclosed in some embodiments as well as the specification and the drawings, but all of them do not have to be provided in order to obtain one or more identical features.

DESCRIPTION OF EMBODIMENTS

Hereinafter, a detailed description will be given of embodiments of the present disclosure with reference to the accompanying drawings.

[Assumptions of CORSETs]

Figure 1A:
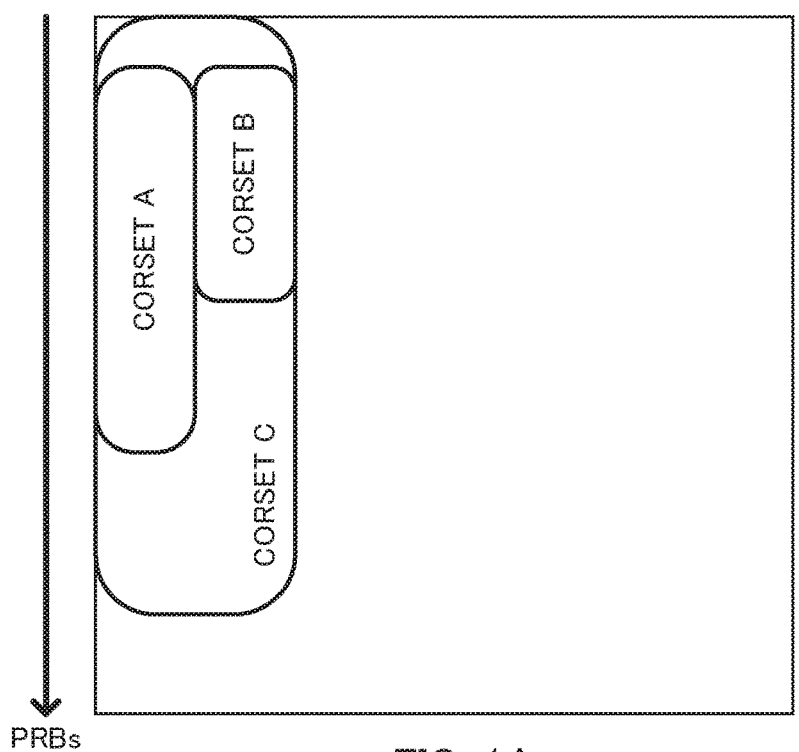
FIG. 1A is a diagram illustrating a configuration example of CORSETs.
Figure 1B:
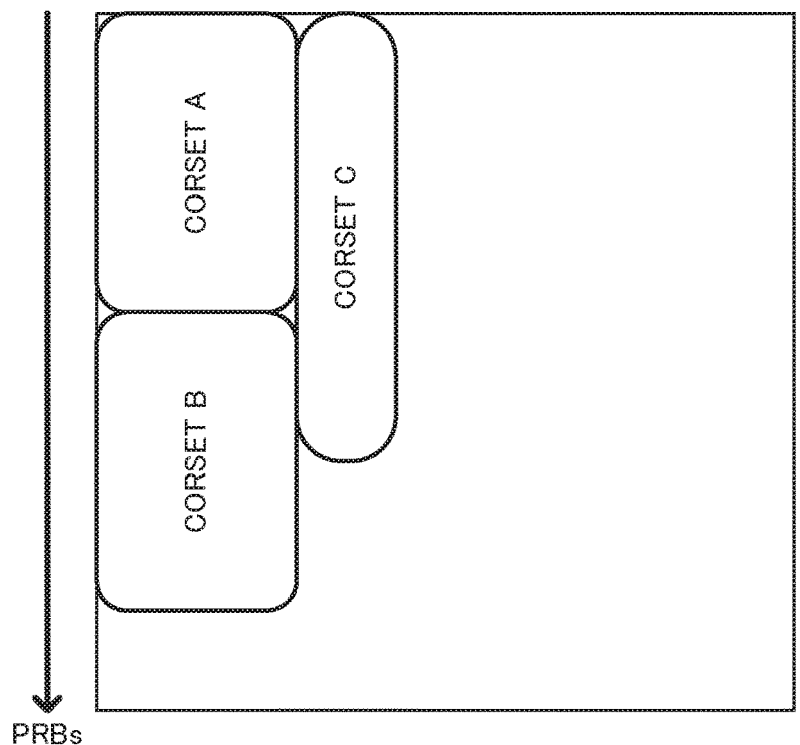
FIG. 1B is a diagram illustrating another configuration example of the CORSETs.

As illustrated in FIGS. 1A and 1B, the following situations are assumed: multiple CORSETs to be mapped are divided from each other in the frequency domain (Frequency Division Multiplexing: FDM); CORSETs are divided from each other in the time domain (Time Division Mulitplexing: TDM); and CORSETs overlap with each other in the frequency domain or the time domain or both.

In addition, each CORSET contains multiple control channel elements (CCEs) such as CCE #0 to CCE #X.

Mainly, there are two types of CORSETs: CORSET to which a UE-specific control signal is mapped (referred to as "UE specific CORSET"); and CORSET to which a control signal directed to multiple UEs is mapped (referred to as "Group common CORSET"). In a Group common CORSET, for example, control signals indicating information common to multiple UEs, such as RACH response, power control, paging indication and assignment of a system information block (SIB) are mapped. These control signals are the signals mainly mapped to a search space called "common search space" in LTE.

Moreover, in a UE specific CORSET, a CCE number applicable to a search space where a DCI is monitored by each UE is defined so as to be found by an ID that identifies the UE (e.g., Radio Network Temporary Identifier (RNTI) or a slot number), for example.

In New RAT, studies have been carried out on configuring a UE with multiple CORSETs as described above. The UE monitors a search space in the multiple CORSETs thus configured in the UE and detects a DCI directed to the UE.

In this case, however, when a UE monitors multiple CORSETs configured in the UE in every slot, the number of candidates for PDCCH regions where a DCI is mapped increases, and causes a problem of increase in power consumption of the UE or increase in probability of erroneous detection.

In this respect, a description will be hereinafter given of a method in which a UE monitors multiple CORSETs and appropriately detects a DCI, and which also reduces the power consumption of the UE and lowers the probability of erroneous detection.

[Summary of Communication System]

A communication system according to each embodiment of the present disclosure includes base station 100 and terminal 200 (UE).

Figure 2:
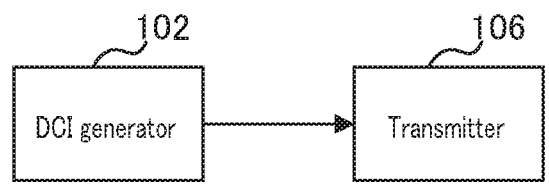
FIG. 2 is a block diagram illustrating part of a configuration of a base station according to Embodiment 1.

FIG. 2 is a block diagram illustrating part of a configuration of base station 100 according to an embodiment of the present disclosure. In base station 100 illustrated in FIG. 2, DCI generator 102 selects one of multiple cases each indicating a combination of CORSETs (or a CORSET) to be monitored by terminal 200 among multiple control channel regions (CORSETs). Transmitter 106 indicates, by higher-layer signaling, configuration information indicating the multiple cases, and indicates the selected case by dynamic signaling.

Figure 3:
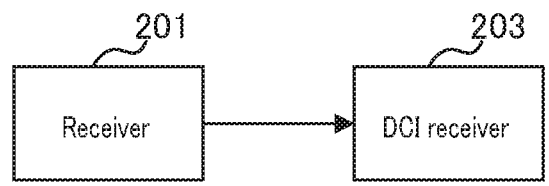
FIG. 3 is a block diagram illustrating part of a configuration of a terminal according to Embodiment 1.

FIG. 3 is a block diagram illustrating part of a configuration of terminal 200 according to an embodiment of the present disclosure. In terminal 200 illustrated in FIG. 3, receiver 201 receives higher-layer signaling containing configuration information indicating multiple cases each indicating a combination of CORSETs (or a CORSET) to be monitored by terminal 200 among multiple control channel regions (CORSETs) and receives dynamic signaling indicating one of the multiple cases. DCI receiver 203 detects control information (DCI) directed to terminal 200 of DCI receiver 203 in a CORSET corresponding to the case indicated by dynamic signaling.

Embodiment 1

[Configuration of Base Station]

Figure 4:
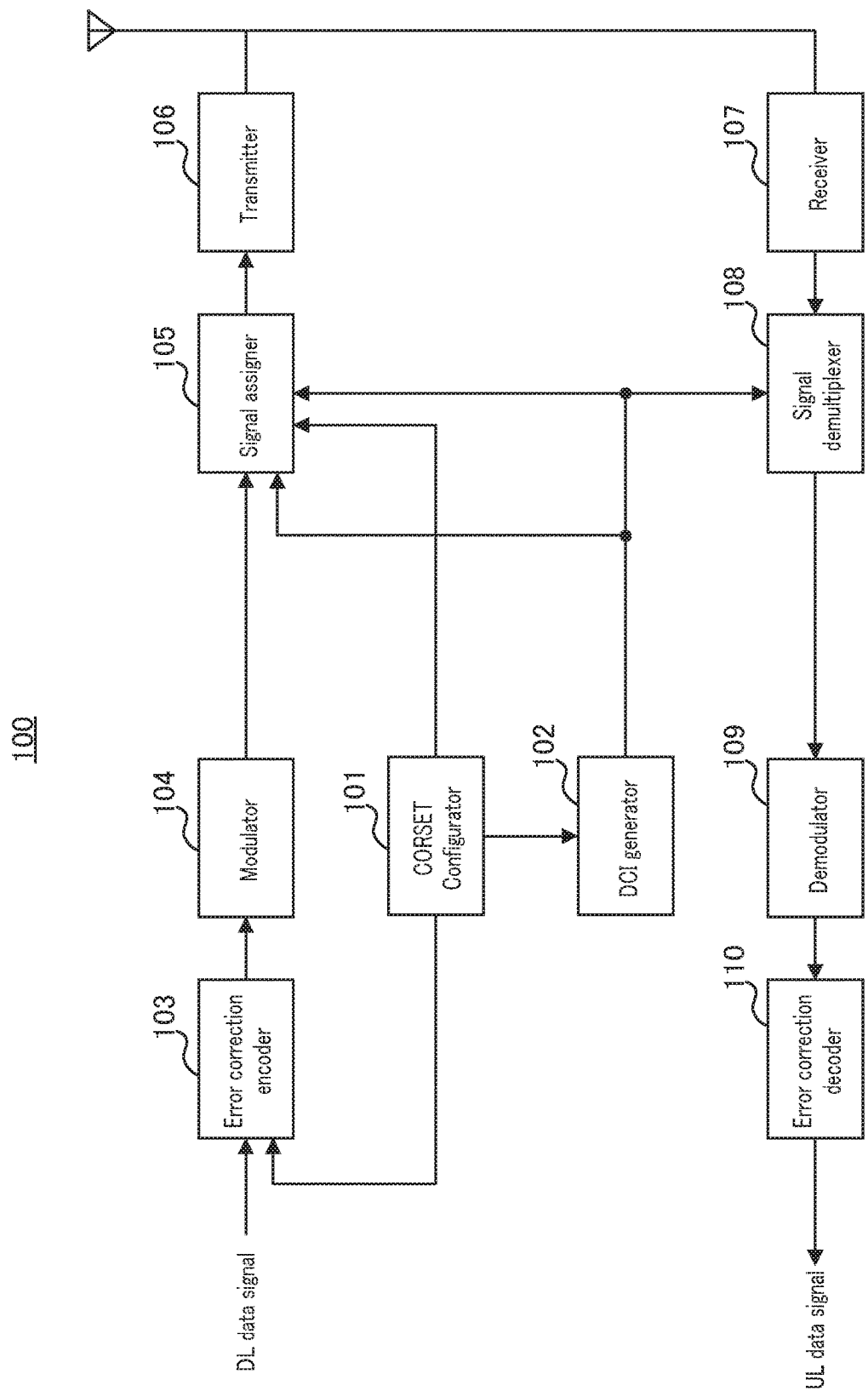
FIG. 4 is a block diagram illustrating the configuration of the base station according to Embodiment 1.

FIG. 4 is a block diagram illustrating the configuration of base station 100 according to Embodiment 1. Base station 100 in FIG. 4 includes CORSET configurator 101, DCI generator 102, error correction encoder 103, modulator 104, signal assigner 105, transmitter 106, receiver 107, signal demultiplexer 108, demodulator 109, and error correction decoder 110.

CORSET configurator 101 configures each terminal 200 (UE) with a CORSET. The configuration (definition) of a CORSET, for example, contains the number of physical resource blocks (PRBs), a PRB number, a symbol number, and the number of symbols where each CORSET is mapped, and an ID used in scrambling the CORSET, a mapping method (localized or distributed) of a resource element group (REG), and information on Quasi collocation (QCL) and/or the like. The configuration of a CORSET may be indicated to terminal 200 by, for example, higher-layer signaling (may be the signaling identical to the signaling used for case configuration information to be described hereinafter or may be different signaling).

Moreover, CORSET configurator 101 determines a combination of CORSETs to be monitored by terminal 200 among multiple CORSETs configured in terminal 200. CORSET configurator 101 then generates higher-layer signaling (system information block (SIB) or dedicated radio resource control (RRC)) containing information indicating multiple cases each indicating the determined combination of CORSETs (hereinafter, referred to as "case configuration information"). CORSET configurator 101 outputs higher-layer signaling to error correction encoder 103 and outputs the case configuration information to DCI generator 102 and signal assigner 105.

DCI generator 102 selects (determines), for example, on the basis of information such as the amount of a control signal or the amount of data per slot (not illustrated), one case corresponding to a CORSET to be monitored by terminal 200 from among the multiple cases indicated by the case configuration information received from CORSET configurator 101 and generates bit information corresponding to the selected case (hereinafter, may be referred to as "case information").

The generated case information (bit information) is mapped to, for example, a group common PDCCH (e.g., see NPL 2), a PDCCH which is mapped to a group common CORSET and can be received by multiple UEs, or a control signal that correctively transmits, using one PDCCH, signals directed to multiple UEs as in DCI format 3/3A of LTE. These control signals are each a DCI that is different from a downlink control signal (DCI) used for indicating DL assignment information or UL assignment information to terminal 200, which will be described hereinafter.

DCI generator 102 outputs a DCI containing case information to signal assigner 105. The control signal containing the case information is generated, for example, in every slot or every subframe, and indicated to terminal 200. Hereinafter, a control signal to be dynamically indicated in every slot or every subframe may be referred to as "dynamic signaling" in order to distinguish the control signal from higher-layer signaling (semi-static indication).

In addition, DCI generator 102 generates a DCI containing resource allocation information for a downlink (DL) data signal or an uplink (UL) data signal (DL assignment information or UL assignment information) and outputs the DCI to signal assigner 105. In addition, DCI generator 102 outputs the DL assignment information to signal assigner 105 and the UL assignment information to signal demultiplexer 108 from the generated DCI.

Error correction encoder 103 applies error correction encoding to a transmission data signal (DL data signal) and a higher-layer signaling (case configuration information) received from CORSET configurator 101 and outputs the encoded signal to modulator 104.

Modulator 104 applies modulation processing to the signal received from error correction encoder 103 and outputs the modulated signal to signal assigner 105.

Signal assigner 105 assigns the signal (DL data signal and/or the case configuration information) received from modulator 104 to a DL resource based on the DL assignment information received from DCI generator 102. Moreover, signal assigner 105 maps a DCI to a CORSET corresponding to a case indicated by the DCI received from DCI generator 102 (case selected by DCI generator 102) (i.e., CORSET to be monitored by terminal 200) among the multiple cases indicated by the case configuration information received from CORSET configurator 101. The transmission signal is formed in the manner described above. The transmission signal thus formed is outputted to transmitter 106.

Transmitter 106 applies radio transmission processing such as up-conversion to the transmission signal received from signal assigner 105 and transmits the resultant signal to terminal 200 via an antenna.

Receiver 107 receives, via the antenna, a signal transmitted from terminal 200, applies radio reception processing such as down-conversion to the received signal, and outputs the resultant signal to signal demultiplexer 108.

Signal demultiplexer 108 demultiplexes a UL data signal from the received signal received from receiver 106, based on the UL assignment information received from DCI generator 102, and outputs the UL data signal to demodulator 109.

Demodulator 109 applies demodulation processing to the signal received from signal demultiplexer 108 and outputs the resultant signal to error correction decoder 110.

Error correction decoder 110 decodes the signal received from demodulator 109 to acquire the received data signal (UL data signal) from terminal 200.

[Configuration of Terminal]

Figure 5:
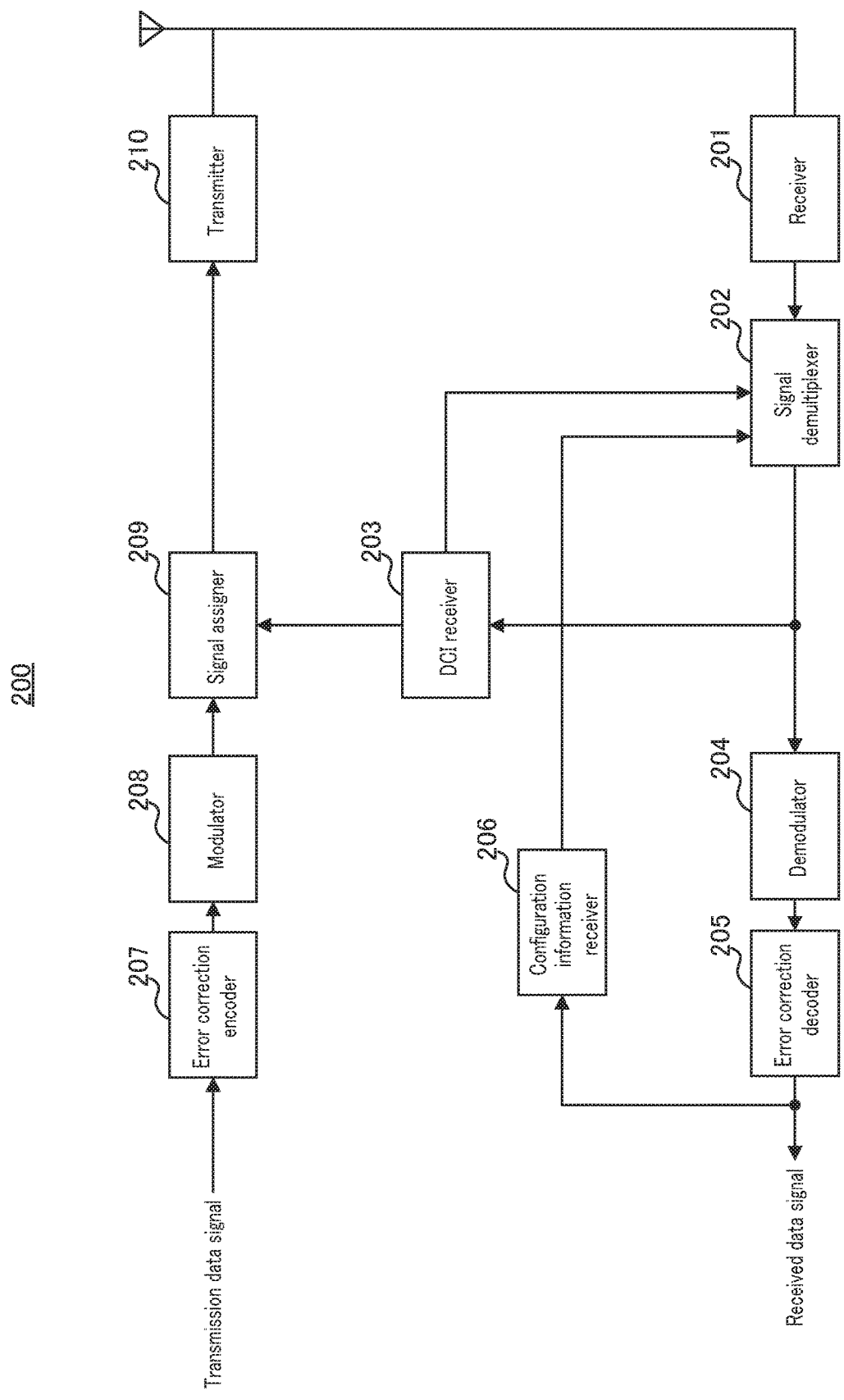
FIG. 5 is a block diagram illustrating the configuration of the terminal according to Embodiment 1.

FIG. 5 is a block diagram illustrating the configuration of terminal 200 according to the present embodiment. In FIG. 5, terminal 200 includes receiver 201, signal demultiplexer 202, DCI receiver 203, demodulator 204, error correction decoder 205, configuration information receiver 206, error correction encoder 207, modulator 208, signal assigner 209, and transmitter 210.

Receiver 201 receives the received signal via an antenna, applies reception processing such as down-conversion to the received signal and then outputs the resultant signal to signal demultiplexer 202. The received signal contains a DL data signal, higher-layer signaling (containing case configuration information) or dynamic signaling (containing case information), for example.

Signal demultiplexer 202 demultiplexes a signal mapped to a resource to which the control signal containing the case information may have been assigned, from the received signal received from receiver 201, and outputs the demultiplexed signal to DCI receiver 203. Note that, as described above, the case information is mapped to, for example, a group common PDCCH, a PDCCH which is mapped to a group common CORSET and can be received by multiple UEs, or a control signal that correctively transmits, using one PDCCH, signals directed to multiple UEs as in DCI format 3/3A of LTE (dynamic signaling).

Signal demultiplexer 202 identifies a resource corresponding to a CORSET to be monitored by terminal 200 of signal demultiplexer 202 (CORSET to be demultiplexed), based on the case information received from DCI receiver 203 and the information indicating multiple cases (combinations of CORSETs) and a configuration of each of the CORSETs received from configuration information receiver 206, then demultiplexes the signal mapped to the identified resource, and outputs the signal to DCI receiver 203. Moreover, signal demultiplexer 202 demultiplexes the DL data signal or higher-layer signaling from the received signal based on the DL assignment information received from DCI receiver 203 and outputs the signal to demodulator 204.

DCI receiver 203 detects the case information from the signal received from signal demultiplexer 202 (signal mapped to a resource to which the control signal containing the case information may have been assigned) and outputs the detected case information to signal demultiplexer 202. DCI receiver 203 attempts decoding on the signal mapped to the resource corresponding to a CORSET, which is received from signal demultiplexer 202, and thus detects (receives) a DCI. DCI receiver 203 outputs the UL assignment information indicated by the received DCI to signal assigner 209 and outputs the DL assignment information to signal demultiplexer 202.

Demodulator 204 demodulates the signal received from signal demultiplexer 202 and outputs the demodulated signal to error correction decoder 205.

Error correction decoder 205 decodes the demodulated signal received from demodulator 204, outputs the received data signal thus obtained, and outputs the higher-layer signaling thus obtained to configuration information receiver 206.

Configuration information receiver 206 identifies a combination of CORSETs for each terminal 200 and a configuration of each of the CORSETs based on the case configuration information or CORSET configuration information contained in the higher-layer signaling outputted from error correction decoder 205. Configuration information receiver 206 outputs the identified information to signal demultiplexer 202.

Error correction encoder 207 applies error correction encoding to the transmission data signal (UL data signal) and outputs the encoded data signal to modulator 208.

Modulator 208 modulates the data signal received from error correction encoder 207 and outputs the modulated data signal to signal assigner 209.

Signal assigner 209 identifies a resource to which UL data is assigned, based on the UL assignment information received from DCI receiver 203. Signal assigner 209 assigns the data signal received from modulator 208 to the identified resource and outputs the resultant signal to transmitter 210.

Transmitter 210 applies transmission processing such as up-conversion to the signal received from signal assigner 209 and transmits the resultant signal via the antenna.

[Operations of Base Station 100 and Terminal 200]

Hereinafter, a detailed description will be given of operations of base station 100 and terminal 200 each configured in the manner described above.

Figure 6:
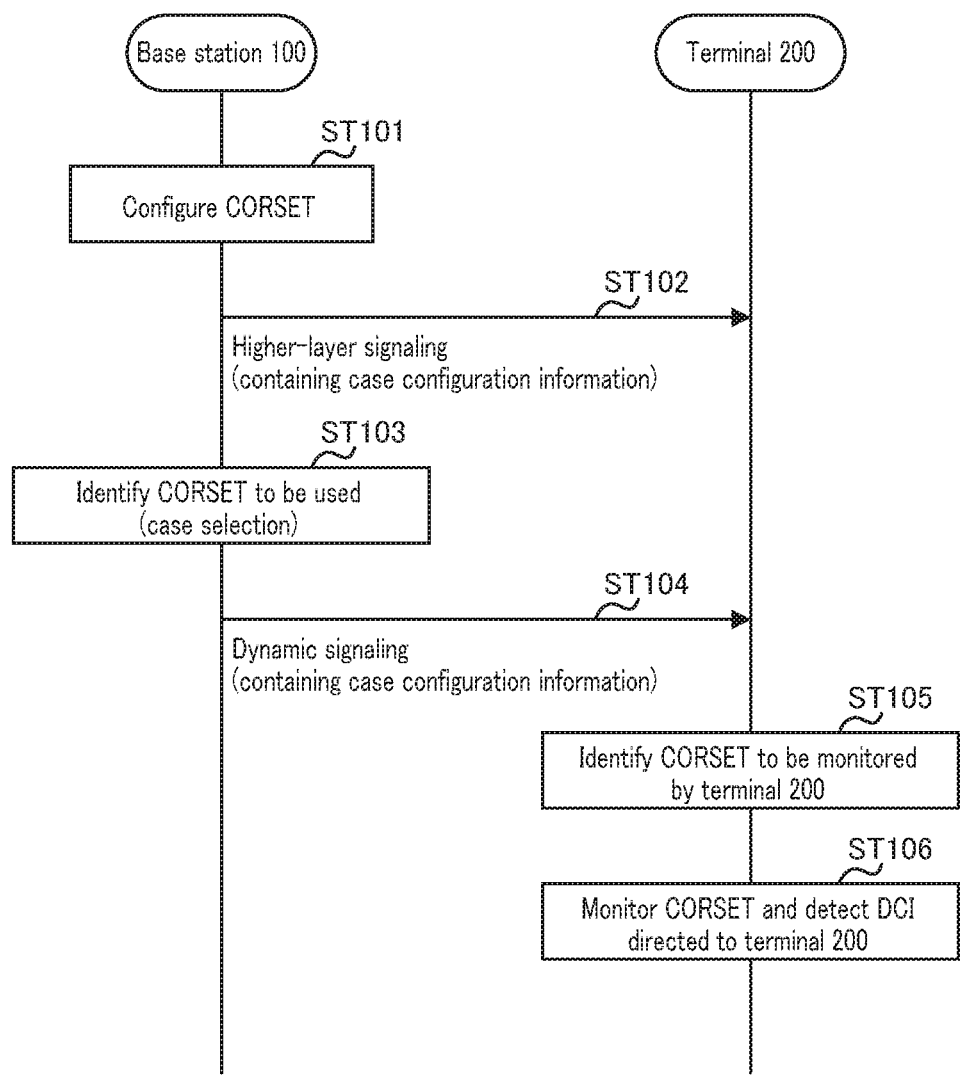
FIG. 6 is a sequence diagram illustrating an operation example of the base station and the terminal according to Embodiment 1.

FIG. 6 is a sequence diagram illustrating operations of base station 100 and terminal 200.

Base station 100 configures CORSETs and multiple cases each indicating a combination of CORSETs to be monitored by terminal 200 (ST 101). Base station 100 transmits case configuration information indicating the multiple cases thus configured to terminal 200 using higher-layer signaling (ST 102).

Next, base station 100 selects one case corresponding to a CORSET to be actually monitored by terminal 200 from among the multiple cases configured in ST 101 (ST 103). Base station 100 then transmits dynamic signaling containing the case information indicating the selected case to terminal 200 (ST 104). Base station 100 maps a DCI (such as resource allocation information) to a CORSET corresponding to the selected case (not illustrated).

Meanwhile, terminal 200 identifies a CORSET to be monitored by this terminal, based on the case configuration information contained in the higher-layer signaling received in ST 102 and the case information contained in the dynamic signaling received in ST 104 (ST 105). More specifically, terminal 200 identifies a CORSET corresponding to the one case indicated by dynamic signaling among the multiple cases indicated by the case configuration information, as the CORSET to be monitored by this terminal.

Terminal 200 monitors the identified CORSET and detects a DCI directed to this terminal (ST 106).

Next, a description will be given of a specific operation example according to the present embodiment.

Base station 100 configures multiple cases each indicating a combination of CORSETs to be simultaneously monitored by terminal 200 as follows and indicates the multiple cases using higher-layer signaling (SIB or dedicated RRC).

Case 1: CORSET A
Case 2: CORSET B
Case 3: CORSETs A, B, and C
Case 4: No monitoring As described above, one case may contain a single CORSET, multiple CORSETs, or No monitoring (monitoring is not performed). In addition, different cases may contain the same CORSET.

Next, base station 100 selects one case corresponding to a CORSET to be monitored by terminal 200 from among Cases 1 to 4, for example, in every slot or every subframe (or at every another timing), and indicates the selected case to terminal 200 using two bits contained in dynamic signaling.

Terminal 200 monitors a CORSET corresponding to the case indicated by dynamic signaling among Cases 1 to 4 indicated by higher-layer signaling and detects a DCI directed to this terminal.

Note that, the following situations are assumed for the dynamic signaling indicating the case: the dynamic signaling is mapped to a group common CORSET or to a predetermined resource (e.g., Physical Control Format Indicator Channel (PCFICH) of LTE). When the dynamic signaling is mapped to a group common CORSET, terminal 200 may monitor the group common CORSET and detect the dynamic signaling indicating the case. Meanwhile, when the dynamic signaling is mapped to a predetermined resource, terminal 200 may detect the dynamic signaling on this resource regardless of mapping of a CORSET.

In this manner, base station 100 can flexibly configure each terminal 200 with a CORSET to be monitored by terminal 200, for example, in every slot or every subframe for each terminal 200. Accordingly, terminal 200 needs to monitor only a CORSET corresponding to the case indicated by base station 100 and does not need to monitor all the CORSETs. Thus, unnecessary monitoring processing for CORSETs otherwise performed by terminal 200 can be prevented, and reduction in the power consumption of terminal 200 and reduction of erroneous detection can be achieved.

Note that, when the one case selected by base station 100 is indicated using a group common PDCCH, or a PDCCH which is mapped to a group common CORSET and can be received by multiple UEs, base station 100 may configure each terminal 200 with a different CORSET (the number of CORSETs or combination) corresponding to each case indicated by higher-layer signaling.

Hereinafter, a description will be given of Configuration Examples 1 and 2 of situations where the configuration of a CORSET corresponding to each case is different for each terminal 200.

Configuration Example 1

Figures 7A, 7B:
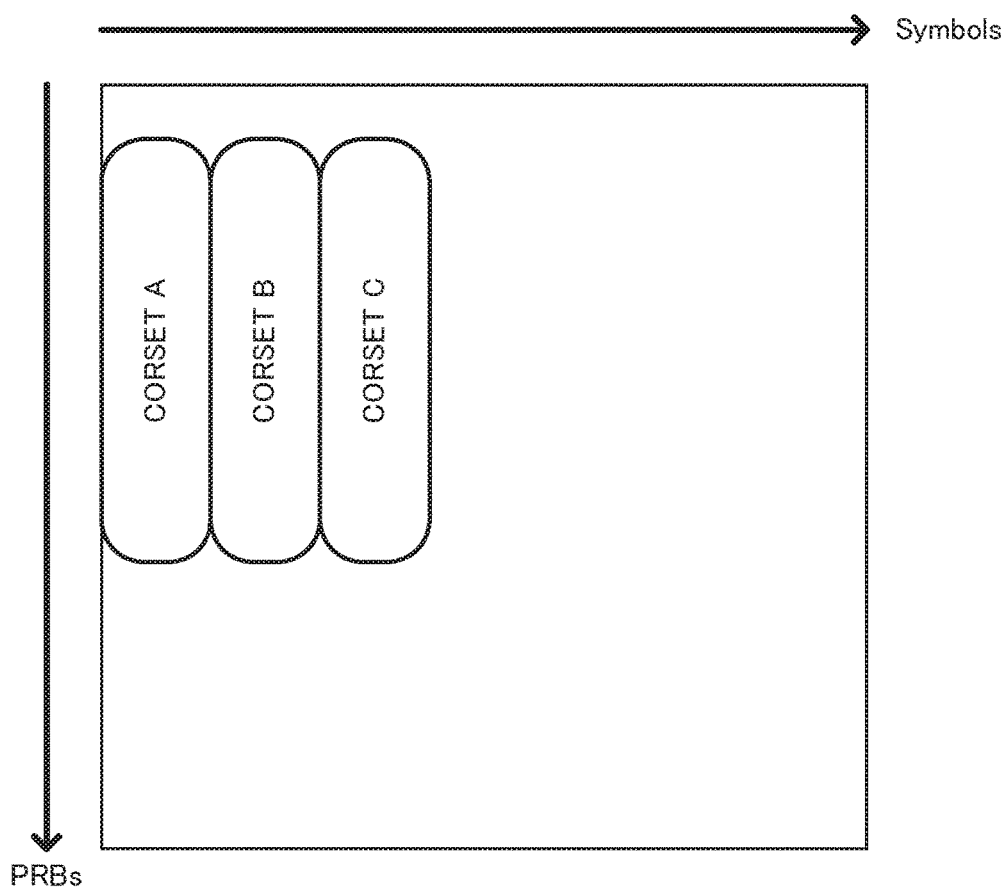
FIG. 7A is a diagram illustrating exemplary cases of CORSETs according to Configuration Example 1 of Embodiment 1.
FIG. 7B is a diagram illustrating a configuration example of the CORSETs according to Configuration Example 1 of Embodiment 1.

FIG. 7A illustrates exemplary CORSETs corresponding to Cases 1 to 4 configured for terminals 200 (UEs A, B, and C).

In FIG. 7A, UE A is configured with CORSET A, UE B is configured with CORSETs A and B, and UE C is configured with CORSETs A, B, and C.

In Case 1 of FIG. 7A, each UE monitors one CORSET A.

In Case 2 of FIG. 7A, each UE monitors CORSETs A and B among CORSETs configured in each UE. Note that, since UE A is not configured with CORSET B, UE A monitors CORSET A.

In Case 3 of FIG. 7A, each UE monitors CORSETs A, B, and C among CORSETs configured in the UE. Note that, since UE A is not configured with CORSET B or C, UE A monitors CORSET A. Meanwhile, since UE B is not configured with CORSET C, UE B monitors CORSETs A and B.

In Case 4 of FIG. 7A, each UE does not monitor any CORSET.

When cases are configured in the manner illustrated in FIG. 7A, base station 100 switches between the cases for each terminal 200 (UE) using, for example, a group common PDCCH or a PDCCH which is mapped to a group common CORSET and which can be received by multiple UEs.

Thus, base station 100 can change the entire amount of CORSETs used for multiple UEs.

As illustrated in FIG. 7B, suppose that CORSETs A, B, and C are mapped in units of symbols, for example.

In this case, when base station 100 indicates Case 1 of FIG. 7A, the number of symbols for the CORSET used by all the UEs is one, when base station 100 indicates Case 2 of FIG. 7A, the number of symbols for the CORSETs used by all the UEs is two, and when base station 100 indicates Case 3 of FIG. 7A, the number of symbols for the CORSETs used by all the UEs is three.

More specifically, the number of symbols for CORSETs to be used by all the UEs can be switched in accordance with the case to be indicated. Base station 100 may perform, for example, an operation to indicate Case 1 in which the number of symbols of CORSETs is small when the number of UEs to be connected is small, and to indicate Case 3 in which the number of symbols for CORSETs is large when the number of UEs to be connected is large.

Configuration Example 2

Figures 8A, 8B:
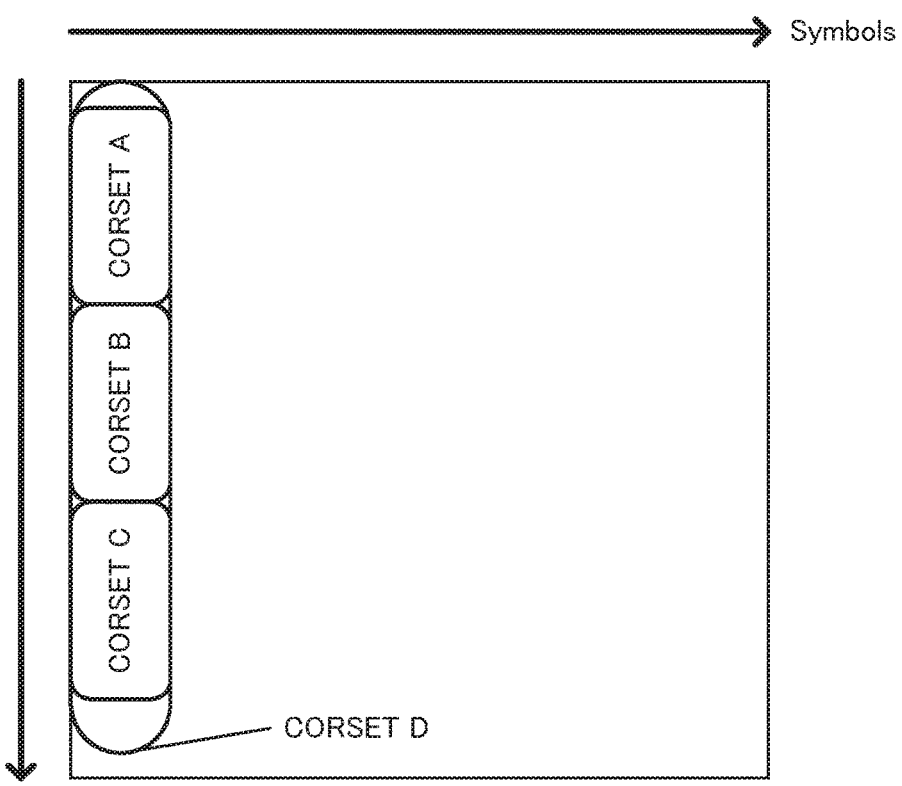
FIG. 8A is a diagram illustrating exemplary cases of CORSETs according to Configuration Example 2 of Embodiment 1.
FIG. 8B is a diagram illustrating a configuration example of the CORSETs according to Configuration Example 2 of Embodiment 1.

FIG. 8A illustrates CORSETs corresponding to Cases 1 to 4 configured in terminals 200 (UEs A, B, and C).

In FIG. 8A, UE A is configured with CORSETs A and D, UE B is configured with CORSETs B and D, and UE C is configured with CORSETs C and D.

In Case 1 of FIG. 8A, UE A monitors CORSET A but UEs B and C do not monitor any CORSET.

In Case 2 of FIG. 8A, UE B monitors CORSET B but UEs A and C do not monitor any CORSET.

In Case 3 of FIG. 8A, UE C monitors CORSET C but UEs A and B do not monitor any CORSET.

In Case 4 of FIG. 8A, all the UEs monitor CORSET D.

When the cases are configured as illustrated in FIG. 8A, base station 100 can change a UE that monitors a CORSET, for example, in every slot or every subframe by switching between the cases for each terminal 200 (UE).

As illustrated in FIG. 8B, suppose that CORSETs A, B, and C are mapped in a frequency-multiplexed manner, and CORSET D is mapped in a wide region containing the frequency domain of CORSETs A, B, and C, for example.

In this situation, base station 100 may perform an operation such that base station 100 indicates a case (any of Cases 1 to 3 in FIG. 8A) corresponding to a UE in connection therewith (UE A, B, or C) when the number of UEs in connection therewith is small and indicates Case 4 when the number of UEs to be connected is large.

The operation examples have been described thus far.

Note that, although the description has been given above of a situation where base station 100 indicates, for each case, CORSETs to be simultaneously monitored by terminal 200, by higher-layer signaling, in addition to this case, base station 100 may indicate a configuration (definition) of a CORSET to terminal 200 by higher-layer signaling. The definition of a CORSET may be contained in the same signaling as the signaling that indicates a case for a CORSET or may be indicated as different signaling before the signaling that indicates a case. The definition of a CORSET contains the number of PRBs, a PRB number, a symbol number, and the number of symbols where the CORSET is mapped, and an ID used in scrambling the CORSET, a mapping method (localized or distributed) of an REG, and information on Quasi collocation (QCL), and/or the like.

As described above, in this embodiment, base station 100 indicates, by higher-layer signaling, case configuration information indicating multiple cases each indicating a combination of CORSETs to be monitored by terminal 200. Base station 100 selects one case used by terminal 200 from among multiple cases and indicates the selected case by dynamic signaling. In other words, indication of a CORSET to be monitored by terminal 200 is made with a combination of higher-layer signaling and dynamic signaling.

Meanwhile, terminal 200 monitors a CORSET corresponding to the case indicated by dynamic signaling among the multiple cases indicated by the case configuration information indicated by higher-layer signaling and detects a DCI (control information) directed to this terminal.

Thus, base station 100 can flexibly change a CORSET to be monitored by terminal 200, for example, in every slot or every subframe by indicating a case for a CORSET to terminal 200 by dynamic signaling. In addition, for changing a CORSET to be monitored by terminal 200, base station 100 may indicate a case using a DCI without indicating a CORSET every time a CORSET is changed. Thus, the signaling overhead for DCIs can be reduced.

Terminal 200 monitors a CORSET corresponding to the case indicated by dynamic signaling, and does not monitor a CORSET not contained in this case. Accordingly, terminal 200 does not have to monitor, in every slot, multiple CORSETs configured in terminal 200, so that unnecessary monitoring of a CORSET can be avoided, and thus the power consumption of terminal 200 can be reduced, and the probability of erroneous detection can be reduced as well.

As described above, according to Embodiment 1, UEs each monitor multiple CORSETs and can appropriately detect a DCI, while the power consumption of the UEs is reduced and the probability of erroneous detection is reduced as well.

Embodiment 2

Note that, a base station and a terminal according to Embodiment 2 include basic configurations common to base station 100 and terminal 200 according to Embodiment 1, so that a description will be given while FIGS. 4 and 5 are incorporated herein.

In Embodiment 2, a description will be given of rules for an operation in a situation where terminal 200 does not receive dynamic signaling (DCI) indicating a case for a CORSET in every slot or every subframe.

Note that, the situation where terminal 200 does not receive a DCI indicating a case for a CORSET is assumed to be, for example, a situation where base station 100 does not transmit a DCI indicating a case for a CORSET, or although the base station transmits a DCI indicating a case for a CORSET, the terminal fails to detect the DCI (misdetection).

Defining the rules for the operation in a situation where terminal 200 receives no DCI allows base station 100 to perform, for example, an operation not to transmit a DCI indicating a case when no change from a specified value is required. In a situation where the control signal region for indicating a case is small, base station 100 can advantageously transmit another signal by not transmitting this DCI.

Hereinafter, a description will be given of Operation Examples 2-1 and 2-2 according to Embodiment 2.

Operation Example 2-1

[Option 1]

For a situation where terminal 200 receives no DCI indicating a case for a CORSET, base station 100 separately indicates, by higher-layer signaling, a CORSET to be monitored by this terminal 200.

In higher-layer signaling, in addition to Cases 1 to 4 exemplified above in Embodiment 1, one case, which is Case 5 for a situation where terminal 200 receives no DCI (no DCI reception) may be additionally configured below, for example.

Case 1: CORSET A
Case 2: CORSET B
Case 3: CORSETs A, B, and C
Case 4: No monitoring
Case 5 (no DCI reception): CORSET C Note that, a CORSET of Case 5 is not limited to CORSET C (the same CORSET as the other cases) and may be another CORSET. In this way, the case to be used in a situation where terminal 200 receives no DCI can be a case different from the CORSETs of Cases 1 to 4 or the same CORSETs.

Thus, a CORSET to be monitored in a situation where terminal 200 receives no DCI can be flexibly configured.

Suppose, for example, a situation where base station 100 does not transmit case information using, as described above, a group common PDCCH, a PDCCH which is mapped to a group common CORSET and which can be received by multiple UEs, or a control signal that collectively transmits, using one PDCCH, signals directed to multiple UEs as in DCI format 3/3A of LTE. In this case, base station 100 may map a DCI containing resource allocation information or the like to a CORSET corresponding to Case 5. Thus, terminal 200 can detect a DCI (resource allocation information or the like) by monitoring the CORSET corresponding to Case 5 indicated by higher-layer signaling even in a situation where terminal 200 receives no DCI containing the case information.

[Option 2]

Base station 100 and terminal 200 specify at least one case (e.g., Case 1) among multiple cases (e.g., Cases 1 to 4 described in Embodiment 1) indicated by higher-layer signaling to be a CORSET to be monitored by terminal 200 for a situation where this terminal 200 receives no DCI indicating a case for a CORSET.

Accordingly, in a situation where terminal 200 receives no DCI indicating a case for a CORSET, new signaling for indicating a CORSET to be monitored by this terminal 200 becomes unnecessary in the higher layer.

When transmitting no case information as described in Option 1, for example, base station 100 may map a DCI containing resource allocation information or the like to the specified CORSET. Accordingly, terminal 200 can detect the DCI (resource allocation information or the like) by monitoring the specified CORSET even in a situation where terminal 200 receives no DCI containing the case information.

[Option 3]

Terminal 200 monitors all the CORSETs configured in this terminal in a situation where terminal 200 receives no DCI indicating a case for a CORSET.

Accordingly, even in a situation where terminal 200 fails to receive a DCI although base station 100 transmits the DCI indicating a case for a CORSET, monitoring all the CORSETs by terminal 200 increases the possibility for terminal 200 to successfully receive another DCI directed to this terminal 200.

[Option 4]

Terminal 200 monitors a specified CORSET in a situation where terminal 200 receives no DCI indicating a case for a CORSET.

In a situation where terminal 200 receives no DCI indicating a case for a CORSET, for example, terminal 200 may monitor a group common CORSET, a CORSET having the smallest CORSET number, or a CORSET having the smallest symbol number among the symbols to which CORSETs are mapped. Note that, the CORSET with the smallest CORSET number may be set to be a group common CORSET.

For a situation where base station 100 does not transmit case information as described in Option 1, for example, base station 100 may map a DCI containing resource allocation information or the like to a specified CORSET. Thus, even in a situation where terminal 200 receives no DCI containing case information, terminal 200 can detect a DCI (resource allocation information or the like) by monitoring the specified CORSET.

Note that, when monitoring a group common CORSET in a situation where terminal 200 receives no DCI containing case information, terminal 200 may monitor a group common CORSET for only a DCI for shared information directed to multiple UEs such as RACH response, power control, paging indication and assignment of an SIB or may also monitor a UE specific DCI.

Accordingly, in a situation where terminal 200 receives no DCI indicating a case for a CORSET, the number of CORSETs to be monitored by this terminal 200 can be suppressed to be small or to a small region. Furthermore, when a CORSET having the smallest symbol number is set to be the CORSET to be monitored by terminal 200 in a situation where terminal 200 receives no DCI indicating a case for a CORSET, the number of symbols to which no data can be assigned by a control signal can be reduced.

The CORSET to be monitored by terminal 200 in a situation where terminal 200 receives no DCI indicating a case for a CORSET is not limited to a group common CORSET, a CORSET having the smallest CORSET number, or a CORSET having the smallest symbol number among the symbols to which CORSETs are mapped.

[Option 5]

For a situation where terminal 200 receives no DCI indicating a case for a CORSET in a slot or a subframe, terminal 200 configures a CORSET to be monitored, in accordance with a type of this slot or subframe.

The type of slot or subframe mentioned herein refers to a slot or subframe for UL, DL, or other purposes (slots that switch between DL and UL, D2D, MTC, eIMTA, and URLLC, for example). In addition, the type of slot or subframe may be defined as the number of DL symbols (DL length) in a slot or a subframe.

Combinations of types of slots or subframes with CORSETs to be monitored by terminal 200 may be configured as follows:

DL slot: CORSETs A and B
UL centric slot: CORSET B
Only UL slot: No monitoring
UL/DL switching slot: CORSET C Note that, the term "UL centric slot" refers to a slot in which a DL control signal is mapped to a forward part of the slot and UL data or a control signal is mapped to a rearward part of the slot. Moreover, the term "only UL slot" refers to a slot in which all the symbols of the slot are assigned to UL.

More specifically, a large number of CORSETs is configured in DL slots because the number of symbols to which a DL control signal is mapped is large in these slots, while a small number of CORSETs is configured in UL centric slots or UL/DL switching slots because the number of symbols to which a DL control signal is mapped is small in these slots as compared with DL slots. Meanwhile, since there are no symbols to which a DL control signal is mapped in only UL slots, "No monitoring" is configured these slots.

Furthermore, the configuration of a CORSET to be monitored in a situation where terminal 200 fails to receive a DCI indicating a case for a CORSET may be indicated by higher-layer signaling or may be specified.

In addition, it is also possible to switch between Options 1 to 4 described above in accordance with the type of slot or subframe. Moreover, it is also possible to switch between Cases 1 to 4 described in Embodiment 1, in accordance with the type of slot or subframe.

Accordingly, terminal 200 can change a CORSET to be monitored, in accordance with the type of slot or subframe. This is effective, for example, when the amount of a CORSET required varies in accordance with the type of slot or subframe.

In a situation where terminal 200 fails to receive a DCI although base station 100 transmits the DCI indicating a case for a CORSET, for example, terminal 200 can estimate, in accordance with the type of slot or subframe, a CORSET used by base station 100 for indicating the DCI, so that the probability of terminal 200 successfully receiving another DCI directed to this terminal 200 increases.

Moreover, when not transmitting case information as described in Option 1, for example, base station 100 may map a DCI containing resource allocation information or the like to a CORSET corresponding to the type of slot or subframe. Accordingly, even in a situation where terminal 200 receives no DCI containing case information, terminal 200 can detect a DCI (resource allocation information or the like) by monitoring the CORSET corresponding to the slot or subframe.

Options 1 to 5 of Operation Example 2-1 have been described thus far.

Operation Example 2-2

In terminal 200, there may be a configuration with which terminal 200 receives no dynamic signaling containing case information of a CORSET (group common PDCCH, a PDCCH which is mapped to a group common CORSET and which can be received by multiple UEs, or a control signal that collectively transmits, using one PDCCH, signals directed to multiple UEs as in DCI format 3/3A of LTE) in any slot or subframe.

In particular, configuring terminal 200 to receive multiple DCIs when reception quality of terminal 200 is poor causes a large amount of resources occupied by DCIs. Moreover, when reception quality of terminal 200 is poor, the probability of erroneous detection or of misdetection in which terminal 200 fails to correctly receive a DCI increases.

In this respect, base station 100 may assign a UE with poor reception quality to a group different from a group of UEs with good reception quality and configure the group to which the UEs with poor reception quality belong, not to receive dynamic signaling indicating a case for a CORSET.

When terminal 200 is configured not to receive dynamic signaling containing case information of a CORSET, for example, Option 3 or 5 described in Operation Example 2-1 may be applied. Thus, although terminal 200 receives no case information, terminal 200 monitors a CORSET to which a DCI (resource allocation information or the like) directed to this terminal may have been mapped, and thus can detect a DCI.

Operation Examples 2-1 and 2-2 according to Embodiment 2 have been described thus far.

As described above, for a situation where base station 100 is configured not to transmit dynamic signaling (e.g., such as a group common PDCCH) indicating a case for a CORSET in every slot or every subframe or for a situation where terminal 200 fails to receive dynamic signaling although base station 100 transmits dynamic signaling indicating a case for a CORSET in every slot or every subframe, terminal 200 monitors a search space in multiple CORSETs thus configured and can appropriately detect a DCI.

Embodiments of this disclosure have been described thus far.

Note that, in the embodiments described above, a description has been given of the situation where four cases are indicated by higher-layer signaling while a case is indicated using two bits contained in a DCI, but the present disclosure is not limited to this case, and the number of cases to be indicated by higher-layer signaling may be a number other than four, a case may be indicated using more than two bits contained in a DCI, and two cases may be indicated using one bit.

Furthermore, in the above embodiments, as to the frequency domain (PRB #), physical mapping has been described as an example, but the present disclosure can be applied to logical mapping as well. In the case of logical mapping, the logical mapping is changed to physical mapping, so that the frequency domain that is contiguous in logical mapping is mapped to physically distant positions. Thus, the frequency diversity effect can be obtained in this case.

Moreover, the DCI described above may be transmitted on a PDCCH transmitted at the time of data assignment for terminal 200 (UE) (UE-specific DCI) or on another PDCCH transmitted with a group common control resource set. In a situation where the DCI is transmitted on a group common PDCCH, since multiple UEs receive the same configuration, overhead can be reduced. Moreover, when the DCI is transmitted on individual PDCCHs, individual configurations can be set for terminals, respectively. Moreover, the DCI may be transmitted on another resource without limitation to a group common resource set and a UE specific control resource set.

Moreover, a group common PDCCH may be defined using a different term such as Physical Control Format Indicator Channel (PCFICH), Physical Slot Format Indicator Channel (PSFICH), or PDCCH type 0.

Moreover, a group common control resource set may be called a common control resource set, a group common search space, or a common search space.

Moreover, the higher-layer signaling may be replaced with MAC signaling. In case of MAC signaling, the frequency of changing the case configured in a UE can be increased as compared with RRC signaling.

The present disclosure can be realized by software, hardware, or software in cooperation with hardware. Each functional block used in the description of each embodiment described above can be partly or entirely realized by an LSI such as an integrated circuit, and each process described in each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI herein may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a Field Programmable Gate Array (FPGA) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

A base station according to the present disclosure includes: circuitry, which, in operation, selects one of a plurality of cases each indicating a combination of control channel regions to be monitored by a terminal among a plurality of control channel regions; and a transmitter, which in operation, indicates, by higher-layer signaling, configuration information indicating the plurality of cases, and indicates the selected case by dynamic signaling.

In the base station according to this disclosure, the transmitter indicates, by the higher-layer signaling, a control channel region for a situation where the dynamic signaling is not received by the terminal, the control channel region being a region to be monitored by the terminal.

In the base station according to this disclosure, a control channel region to be monitored by the terminal is specified for a situation where the dynamic signaling is not received by the terminal.

In the base station according to this disclosure, the specified control channel region is at least one of the plurality of control channel regions.

In the base station according to this disclosure, the specified control channel region is a control channel region having a smallest control channel region number or having a smallest symbol number of a symbol where the control channel region is mapped.

In the base station according to this disclosure, the specified control channel region is associated with a type of slot in which the dynamic signaling is not received.

A terminal according to the present disclosure includes: a receiver, which in operation, receives higher-layer signaling containing configuration information indicating a plurality of cases each indicating a combination of control channel regions to be monitored by the terminal among a plurality of control channel regions, and receives dynamic signaling indicating one of the plurality of cases; and circuitry, which, in operation, detects control information directed to the terminal in the control channel region corresponding to the one case indicated by the dynamic signaling among the plurality of cases.

A communication method according to this disclosure includes: selecting one of a plurality of cases each indicating a combination of control channel regions to be monitored by a terminal among a plurality of control channel regions; and indicating, by higher-layer signaling, configuration information indicating the plurality of cases, and indicating the selected case by dynamic signaling.

A communication method according to this disclosure includes: receiving higher-layer signaling containing configuration information indicating a plurality of cases each indicating a combination of control channel regions to be monitored by a terminal among a plurality of control channel regions, and receiving dynamic signaling indicating one of the plurality of cases; and detecting control information directed to the terminal in the control channel region corresponding to the one case indicated by the dynamic signaling among the plurality of cases.

INDUSTRIAL APPLICABILITY

An aspect of this disclosure is useful in mobile communication systems.

REFERENCE SIGNS LIST

100 Base station
101 CORSET configurator
102 DCI generator
103, 207 Error correction encoder
104, 208 Modulator
105, 209 Signal assigner
106, 210 Transmitter
107, 201 Receiver
108, 202 Signal demultiplexer
109, 204 Demodulator
110, 205 Error correction decoder
200 Terminal
203 DCI receiver
206 Configuration information receiver

The invention claimed is:
1. A base station comprising:
circuitry, which, in operation, selects one of a plurality of cases each indicating a first combination of control channel regions to be monitored by a first terminal among a plurality of control channel regions and a second combination of control channel regions to be monitored by a second terminal among the plurality of control channel regions; and
a transmitter, which in operation, indicates, by higher-layer signaling, configuration information indicating the plurality of cases to the first and second terminals, and indicates the selected case by dynamic signaling in the form of a control signal in a DCI (downlink control information) format directed to the first and second terminals,
wherein the first combination indicated by the selected case to be monitored by the first terminal is different from the second combination indicated by the selected case to be monitored by the second terminal.

2. The base station according to claim 1, wherein the transmitter indicates, by the higher-layer signaling, a control channel region for a situation where the dynamic signaling is not received by the first or second terminal, the control channel region being a region to be monitored by the first or second terminal.

3. The base station according to claim 1, wherein a control channel region to be monitored by the first and second terminals is specified for a situation where the dynamic signaling is not received by the first and second terminals.

4. The base station according to claim 3, wherein the specified control channel region is at least one of the plurality of control channel regions.

5. The base station according to claim 3, wherein the specified control channel region is a control channel region having a smallest control channel region number or having a smallest symbol number of a symbol where the control channel region is mapped.

6. The base station according to claim 3, wherein the specified control channel region is associated with a type of slot in which the dynamic signaling is not received.

7. The base station according to claim 1, wherein the indicated case for the first terminal is switched among the plurality of cases in accordance with a number of terminals connected to the base station, the terminals including at least the first and second terminals.

8. A first terminal comprising:
a receiver, which in operation, receives, from a base station, higher-layer signaling containing configuration information indicating a plurality of cases each indicating a first combination of control channel regions to be monitored by the first terminal among a plurality of control channel regions and a second combination of control channel regions to be monitored by a second terminal among the plurality of control channel regions, and receives, from the base station, dynamic signaling indicating one of the plurality of cases, the dynamic signal being in the form of a control signal in a DCI (downlink control information) format directed to the first and second terminals; and circuitry, which, in operation, detects control information directed to the first terminal in the control channel region corresponding to the one case indicated by the dynamic signaling among the plurality of cases, wherein the first combination indicated by the one case to be monitored by the first terminal is different from the second combination indicated by the one case to be monitored by the second terminal.

9. The first terminal according to claim 8, wherein the indicated case for the first terminal is switched among the plurality of cases in accordance with a number of terminals connected to the base station, the terminals including at least the first and second terminals.

10. A communication method performed by a base station, the communication method comprising:

selecting one of a plurality of cases each indicating a first combination of control channel regions to be monitored by a first terminal among a plurality of control channel regions and a second combination of control channel regions to be monitored by a second terminal among the plurality of control channel regions; and indicating, by higher-layer signaling, configuration information indicating the plurality of cases to the first and second terminals, and indicating the selected case by dynamic signaling in the form of a control signal in a DCI (downlink control information) format directed to the first and second terminals, wherein the first combination indicated by the selected case to be monitored by the first terminal is different from the second combination indicated by the selected case to be monitored by the second terminal.

11. The communication method according to claim 10, wherein the indicated case for the first terminal is switched among the plurality of cases in accordance with a number of terminals connected to the base station, the terminals including at least the first and second terminals.

12. A communication method performed by a first terminal, the communication method comprising:

receiving, from a base station, higher-layer signaling containing configuration information indicating a plurality of cases each indicating a first combination of control channel regions to be monitored by the first terminal among a plurality of control channel regions and a second combination of control channel regions to be monitored by a second terminal among the plurality of control channel regions, and receiving, from the base station, dynamic signaling indicating one of the plurality of cases, the dynamic signal being in the form of a control signal in a DCI (downlink control information) format directed to the first and second terminals; and detecting control information directed to the first terminal in the control channel region corresponding to the one case indicated by the dynamic signaling among the plurality of cases, wherein the first combination indicated by the one case to be monitored by the first terminal is different from the second combination indicated by the one case to be monitored by the second terminal.

13. The communication method according to claim 12, wherein the indicated case for the first terminal is switched among the plurality of cases in accordance with a number of terminals connected to the base station, the terminals including at least the first and second terminals.

\* \* \* \* \*